Feb. 14, 1967    W. B. GILES    3,303,811
METHOD AND APPARATUS FOR DRAG REDUCTION
Filed April 29, 1965

Inventor:
Walter B. Giles,
by Paul A. Frank
His Attorney.

United States Patent Office 3,303,811
Patented Feb. 14, 1967

3,303,811
METHOD AND APPARATUS FOR DRAG
REDUCTION
Walter B. Giles, Scotia, N.Y., assignor to General Electric
Company, a corporation of New York
Filed Apr. 29, 1965, Ser. No. 451,933
7 Claims. (Cl. 114—67)

My invention relates to a way of reducing drag on water vehicles, and more particularly, to a method and apparatus for adding drag reducing materials to the water surrounding a ship in a manner that reduces drag thereon and uses a minimum of material to accomplish effective drag reduction.

In the movement of ships and other vehicles through water, a large amount of energy is expended in overcoming frictional drag along the sides of the vessel imparted by the water through which it travels. This drag expends energy that could well be used to increase the speed of the vessel or to otherwise increase the efficiency of operation thereof. Many attempts have been made to overcome these frictional losses, but, as yet, none have been significantly commercially successful. While drag reducing additives have been employed, their use has not been too successful since they are injected or otherwise placed in the water at the bow of the ship with the hope that they will travel in the proper direction without any means for altering their direction or their effectiveness once they are placed in the water. The need then arises for a method of properly directing the flow of additives so that after they are in the water, maximum use can be made of their drag reducing properties without relying on mere chance results. If these additives were properly directed, effect could be taken of a laminar boundary layer along the side of the ship which causes very little drag in itself, and thereby the combination of the laminar boundary layer with the drag reducing additives could substantially reduce drag on the ship without requiring a large amount of additive. My invention envisions a way of substantially reducing the amount of drag reducing additive required to reduce frictional drag along the sides of a vessel by directing the flow of the additive.

The chief object of my invention is the provision of a method of directing the flow of drag reducing additives along the sides of a water vehicle.

Another object of my invention is such a device which makes use of a laminar boundary layer in combination with the drag reducing additives to thereby use a minimum of additive.

A further object of my invention is the provision of apparatus for deflecting the flow stream of drag reducing additives to substantially eliminate a turbulent boundary layer along the side of a water vehicle.

These and other objects of my invention will be more readily perceived from the description which follows.

One of the features of my invention is a highly efficient method and apparatus for reducing drag on ships and other water vehicles. A drag reducing additive is injected into the water proximate the bow of a ship, and as it passes along the surface of the vessel, is deflected so that it prevents any turbulent boundary layer from forming. The deflecting water jet also forms a laminar boundary layer along the side of the vessel which acts in combination with the additive to substantially reduce frictional drag along the sides of the vessel. The use of the laminar boundary layer formed by the water jet properly directs the application of the additive and also substantially reduces the amount of additive needed, since no additive is needed immediately adjacent the vessel where the laminar boundary layer has formed.

The attached drawing illustrates preferred embodiments of my invention in which

Figure 1:
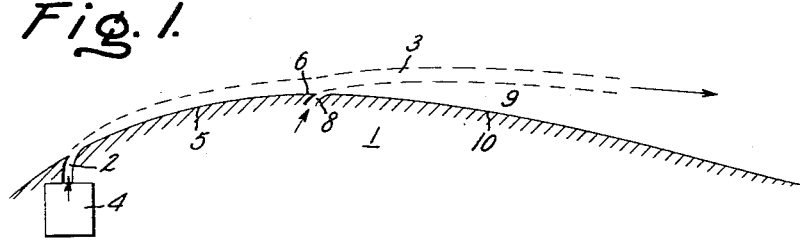
FIGURE 1 is a cross-sectional view of a ship employing my drag reducing invention.

In FIGURE 1, there is shown a cross-sectional view of a ship employing the drag reduction method of my invention. A suitable distribution inlet 2 or other port is positioned adjacent the front end, bow, of a water vessel such as ship 1. Drag reducing additives, as will subsequently be described, premixed with a water solution are stored or prepared in a suitable tank or other container which communicates with opening 2. The additives are premixed with water in container 4. The water being added to the additive when it is originally placed within container 4, or as will subsequently be described, with respect to FIGURE 2 by a water inlet technique. The water mixed additive is ejected through opening 2 and flows along the side surface or skin 5 of vehicle 1 until point 6 is reached. Water or other suitable liquid is ejected through opening 8 at point 6 to properly deflect the additive flow stream 3 away from the side of the vessel in a manner so that it passes through the critical points where turbulence would begin to form. In other words, joint 6 is the point where, because of the critical variables inherent in the construction of the ship, the ejection of additive will prevent any critical disturbances from forming and thereby prevent turbulence from forming. Thus, by the ejection of water at this point to deflect the additive flow stream so that it passes laminarly through the critical points at which turbulence would form a turbulent boundary layer is substantially eliminated. This critical point is a point where the slight disturbance begins which produces a turbulent boundary layer. The flow stream of the water ejected through opening 8 deffects the additive to enshroud the critical points where disturbances leading to turbulence would form. In passing through the critical points, as a laminar flow sheet the additive 3 completely eliminates the critical points where the disturbances causing turbulence would form. Turbulence would severely mix the additive to substantially dissipate its effectiveness and thereby substantially increase the frictional drag along the surface of ship 1.

The water ejected through opening 8 fills space 9 by being placed between surface 10 of ship 1 and the flow stream 3 to form a laminar layer which has relatively little frictional drag along the surface of the ship. Thus, the small additive layer at 3 serves the same purpose with the same efficiency as if the entire area 9 plus the area 3 where the additive is now flowing were filled with additive. Therefore, the injection of water through opening 8 creates a boundary layer at 9 which by being laminar and properly deflecting the flow of additives 3 to eliminate the critical disturbances substantially reduces frictional drag along surface 10 of ship 1. It will be appreciated that without my water injection port at 8, the additive flow stream would have to be substantially thicker at point 6 and continue to increase to cover both area 3 and area 9 to properly avoid any disturbances which will cause turbulence. The formation of disturbances will lead to turbulence and substantially eliminate any effectiveness that the drag reducing additives might have. Therefore, by properly positioning water inlet 8 to envelope the critical points and provide a laminar boundary layer, turbulence around the boundary layer of the ship is substantially eliminated with only a minimum amount of additive employed. With the method of the present invention, the drag reducing additives can be deflected in any manner so that they properly achieve the greatest drag reduction with the least amount of additive possible. By this method, it is also possible to correct slight errors in adding the additives since a water jet at 8 tends to properly align the additive stream for optimum drag reducing potential. It will also be appreciated that other water jets may be placed further along surface 10 of vessel 1 to further deflect the additive boundary layer as required.

The additives used with this invention are generally commercially available drag reducing additives which have the following characteristics. They are viscoelastic, water soluble polymers which are highly polar, have a generally high molecular weight, have high hydrogen bond forming capability and are linear, i.e., have a large length to diameter ratio with very little branching. The viscoelasticity and water solubility are essential for the additive to properly enter into solution and readily affect the water layers in a proper manner so that drag is substantially reduced. The length of the molecule as brought out by its linearity and high polarity appears to help form the additive flow stream in a linear manner and thereby avoid turbulence and eliminate disturbances that cause turbulence to substantially reduce drag on the ship. Some additives that have been found particularly suitable and meet these requirements are guar gum, locust beam gum, carrageenan or Irish moss, gum karaya, hydroxyethyl cellulose, sodium carboxymethylcellulose, polyethylene oxide, polyacrylamide and polyvinylpyrrolidone. While these additives have been found to be effective, they are merely exemplary of additives having the characteristics required for proper drag reduction and are in no way limiting on my invention.

Figure 2:
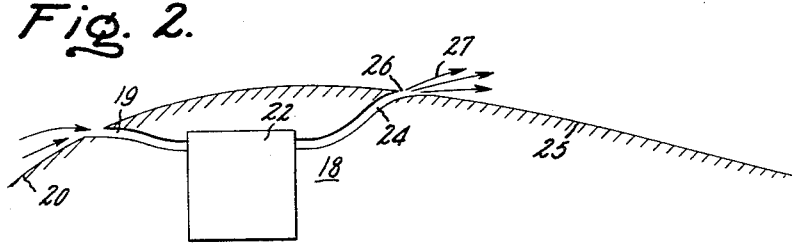
FIGURE 2 is a cross-sectional view of an apparatus for mixing the additive before it is injected into the flow stream.

FIGURE 2 illustrates an apparatus for mixing the additive with water without having to premix the additive before it is ready to be used. In this method, a port 19 is formed near bow 20 of ship 18 whereby water is taken into mixing section 22 and mixed with the additive. Additives are either present in mixing section 22 or may be added by a suitable pump or other injection device from a separate supply container. The mixed additives which are now in solution are then ejected by way of opening 24 in a manner that causes them to assume a laminar boundary flow layer over surface 25 of ship 18. This is mainly accomplished by the shape of exit orifice 26 which is designed to provide a small angle with respect to the side 25 of the ship. In other words, the angle between the ejection stream 27 and the surface 25 of the ship is very small so that the additive mixture passes through tube 24 and into a boundary layer along surface 25 in a smooth, even, laminar manner. Suitable power such as a pump may be applied in mixing section 22 to properly eject the additive flow through tube 24. Alternatively, if the speed of the ship is substantial, the water may be admitted through the tube 19, passed through the mixing section, bringing the additive into solution and passed out through exit orifice 24 by employing the forward momentum of the ship. The additive is deflected by a suitable water jet as described in FIGURE 1 with respect to water jet 8 so that turbulence may be eliminated in this same manner as in FIGURE 1.

Figure 3:
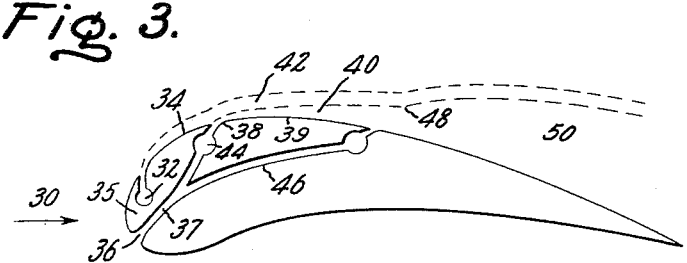
FIGURE 3 is the application of my invention to a hydrofoil ship.

FIGURE 3 illustrates a hydrofoil of the type used on hydrofoil ships. The hydrofoil is a part of the hydrofoil ship that is underwater and serves as the lifting means when the ship leaves the water and is supported on struts. Drag reducing additive is contained in a suitable enclosure 32 located toward the front end of leading edge 35 of hydrofoil 31. The additive, as with the previously mentioned methods, may be premixed or may be mixed by the injection of water as with FIGURE 2. The additive then flows in a laminar manner over surface 34 of hydrofoil 31. Inlet water is brought into opening 36 at the bottom or leading edge 35 of hydrofoil 31. The water then flows through a tube 37 and out at point 38, along upper edge 39 of hydrofoil 31. By deflecting the additive flow stream at point 38 by the injection of water through tube 37, the additive flow stream is directed so that this laminar flow stream passes through the critical disturbance points to thereby eliminate them and substantially reduce frictional drag caused by turbulence on the air foil, in the same manner with the same effects as previously described with respect to FIGURE 1. By the injection of water at point 38, a laminar boundary layer is formed at 40 below additive flow stream 42 to combine therewith in substantially eliminating turbulence which will cause disbursion of the additive and increase drag on the hydrofoil, as previously mentioned. A reservoir 44 may be formed near the point of ejection 38 of tube 37 so that water may be retained within the air foil to provide a more uniform flow at point 38. By the use of reservoir 44, there is a constant flow of water at point 38 regardless of the amount of water or the consistency with which it comes in at 36.

Alternatively, a branch 46 may be formed from tube 37 to further deflect the additive flow stream at point 48 to thereby cause it to pass through the remaining critical points where turbulence may form. This is done in the same manner as with point 38 and accomplishes the same result in eliminating turbulence which would cause additional drag on the hydrofoil. Also as before, a reservoir 47 may be provided for making flow more consistent if desired. Further tubes may be provided further along surface 39 of air foil 31 if desired to further eliminate any points of turbulence that will form. Thus, a thin flow stream of additive accomplishes the same results as if the entire area 40 and 50 below the additive stream 42 and above surface 39 of the air foil were filled with additive. Also, more control over the exact manner in which the additive disperses to properly reduce drag is accomplished.

It will be apparent from the foregoing, that my invention attains the objectives set forth. Apparatus embodying the invention is sturdy in construction and well adapted for use in conjunction with marine environments. Because of the substantial elimination of drag with a minimum of additive, a highly efficient method of reducing frictional drag on water vehicles is accomplished.

Specific embodiments of my invention have been illustrated but the invention is not limited thereto, since many modifications may be made by one skilled in the art and the appended claims are intended to cover all such modifications as fall within the true spirit and scope of my invention.

What I claim as new and desire to secure by Letters Patent of the United States is:

1. A method of reducing drag on water vehicles comprising the steps of
    adding a drag reducing shear thinning additive proximate the surface of a water vehicle to reduce frictional drag thereon,
    and injecting a liquid in the general direction of the flow stream to deflect the flow stream of said additive so that it passes through critical points of disturbance to thereby substantially eliminate the formation of a turbulent boundary layer proximate the surface of the water vehicle to substantially reduce frictional drag with a minimum use of the drag reducing additive.

2. A method of reducing frictional drag on water vehicles comprising the steps of
    adding proximate the surface of the vehicle an additive that reduces frictional drag on water vehicles and which has the characteristics of being a water soluble viscoelastic linear polymer, and
    deflecting the flow stream of additive by the injection of a liquid along the flow stream so that it passes through the critical points along the surface of the water vehicle where turbulence begins to form so that turbulence is substantially eliminated with a minimum use of drag reducing additive.

3. A method of reducing frictional drag on ships comprising the steps of injecting a drag reducing additive comprising a viscoelastic, water soluble polymer into the flow stream proximate the forward end of a ship so that a laminar boundary layer of the additive flows along the surface of the ship, and deflecting the flow stream of the additive by the injection of a water jet so that the additive flow stream passes through the critical points where turbulence would form to thereby eliminate formation of turbulence with only a thin layer of additive and thereby substantially reduce drag on the ship.

4. A method of reducing frictional drag on ships comprising the steps of injecting a drag reducing additive comprising a viscoelastic water soluble linear polymer into the flow stream, proximate the front end of a ship to form a laminar additive flow stream in the direction of flow of water around the ship to reduce frictioinal drag thereon, and injecting a stream of water at a point along the flow stream surrounding the ship so that the additive flow stream passes through critical points at which a disturbance which leads to turbulence, begins to form to eliminate these points and also to form a laminar boundary layer of water below the additive flow stream to act in combination with the additive flow stream to reduce frictional drag on the ship.

5. A method of reducing frictional drag on water vehicles comprising the steps of ingesting water into the vehicle at the forward end of the vehicle, mixing drag reducing additive with the water, injecting the drag reducing additive mixed with water into the flow stream along the surface of the vehicle to form a laminar boundary layer to reduce frictional drag thereon, deflecting the flow stream of the additive by the addition of a jet of water so that the additive flow stream passes through the critical points where turbulence forms to thereby substantially eliminate turbulence along the boundary layer of the vehicle to thereby substantially reduce frictional drag on the surface of thereof.

6. A method of reducing frictional drag on hydrofoil ships comprising the steps of injecting a drag reducing additive comprising a water soluble viscoelastic linear polymer into the flow stream along the upper surface of a hydrofoil to thereby form a linear boundary layer to reduce frictional drag, ingesting a stream of water at the forward end of the hydrofoil and passing the stream of water through the hydrofoil, injecting the stream of water at the upper edge of the hydrofoil to deflect the flow stream of additive so it passes through the critical points where turbulence will form to thereby substantially eliminate turbulence on the surface of the hydrofoil and also to form a water boundary layer below said additive layer to substantially reduce the amount of additive that is employed for drag reduction.

7. Apparatus for reducing frictional drag on water vehicles comprising means for adding a drag reducing additive, comprising a viscoelastic, water soluble, linear polymer, proximate to the surface of a water vehicle so that a laminar boundary layer is formed to reduce frictional drag thereon, and water ejection means situated at a point along the surface of the water vehicle so that the additive flow stream is deflected to pass through the critical points and thereby substantially eliminate the possibility of formation of turbulence along the surface of the water vehicle and at the same time form a laminar water boundary layer between the additive flow stream and the surface of the water vehicle to substantially reduce the amount of additive needed to reduce frictional drag on the water vehicle.

References Cited by the Examiner
UNITED STATES PATENTS

| 3,016,865 | 1/1962 | Eichenberger | 114—67 |
| 3,075,489 | 1/1963 | Eichenberger | 114—67 |
| 3,196,823 | 7/1965 | Thurston | 114—67 |
| 3,230,919 | 1/1966 | Crawford | 114—67 |

MILTON BUCHLER, *Primary Examiner.*

ANDREW H. FARRELL, *Examiner.*